United States Patent
Fetterolf et al.

[15] 3,658,083
[45] Apr. 25, 1972

[54] FLUSH BOTTOM TANK VALVE

[72] Inventors: John S. Fetterolf, 750 Spruce Street, Royersford, Pa. 19468; James W. Williams, III, 705 Whites Road, Lansdale, Pa. 19446

[22] Filed: Jan. 6, 1971

[21] Appl. No.: 104,322

[52] U.S. Cl.................................137/244, 251/144, 251/186, 251/189
[51] Int. Cl..........................................................F16k 29/00
[58] Field of Search....................137/244; 251/144, 186, 189

[56] References Cited

UNITED STATES PATENTS

| | | | |
|---|---|---|---|
| 1,044,259 | 11/1912 | Schiller | 251/186 |
| 1,639,853 | 8/1927 | Maanum | 251/144 |
| 2,530,433 | 11/1950 | Jaegle | 137/244 |
| 2,585,667 | 2/1952 | Meador | 251/189 |
| 3,211,422 | 10/1965 | Brown | 251/144 X |

Primary Examiner—Harold W. Weakley
Attorney—Jackson, Jackson and Chovanes

[57] ABSTRACT

A flush tank valve having a plunger and two converging passages. One passage is vertical and the plunger operates in it and the other passage goes off to the side and handles the discharge. The plunger opens by withdrawal beyond the discharge passage. The plunger has a packing moving with the plunger and spring compressed so that in closed position it engages the wall of the body close to the upper end of the valve, but in opening position it engages the wall of the body beyond the branching of the Y. There is gland a packing glad sealing the lower end of the plunger and compressed by spring means, acting between the plunger and an enlarged portion of the body and entirely independent in its operating parts from the packing at the upper end of the plunger. A scraper ring is preferably employed ahead of the packing on the plunger to remove material adhering to the inside wall of the body.

4 Claims, 3 Drawing Figures

PATENTED APR 25 1972

INVENTORS.
JOHN S. FETTEROLF
JAMES W. WILLIAMS, 3RD
BY
Jackson, Jackson & Chovanes
ATTORNEYS.

INVENTORS.
JOHN S. FETTEROLF
JAMES W. WILLIAMS, 3RD
BY
Jackson, Jackson, & Chovanes
ATTORNEYS.

FLUSH BOTTOM TANK VALVE

DISCLOSURE OF INVENTION

The invention relates to a flush bottom tank valve of the type which is used in chemical processes, food preparation, and other industries in the bottom of tanks, kettles, reactors and autoclaves to drain the contents when desired. It has a clear flow passage when open to allow the contents to flow through outlet piping.

A purpose of the invention is to use wholly separate seal mechanism at the two ends of the plunger.

A further purpose is to mount packing on the upper end of the plunger to seal the body when the plunger is advanced, this packing being protected by the plunger upper head when the plunger is withdrawn below the branching of the Y.

A further purpose is to provide belleville spring means to compress the packing on the upper end of the plunger.

A further purpose is to use a wholly separate gland packing between the body and the lower end of the plunger, and to compress this packing by wholly separate belleville springs applied to the gland.

A further purpose is to apply additional pressure to the packing gland by the plunger lower head when the valve is closed.

A further purpose is to scrape the inside of the body in moving the plunger upwardly to close the valve so as to protect the seal ring on the plunger.

Further purposes appear in the specification and in the claims.

In the drawings I have chosen to illustrate one only of the numerous embodiments in which my invention may appear, choosing the form shown from the standpoint of satisfactory operation and effective demonstration of the principles involved.

Figure 1:
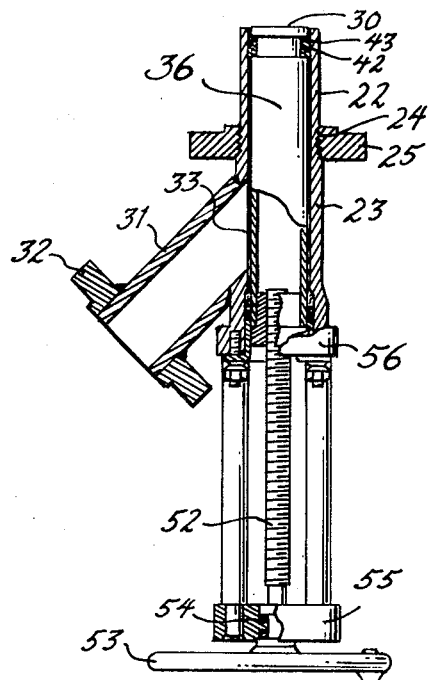
FIG. 1 is a central vertical section of the flush bottom tank valve of the invention, some parts being shown in elevation.
Figure 2:
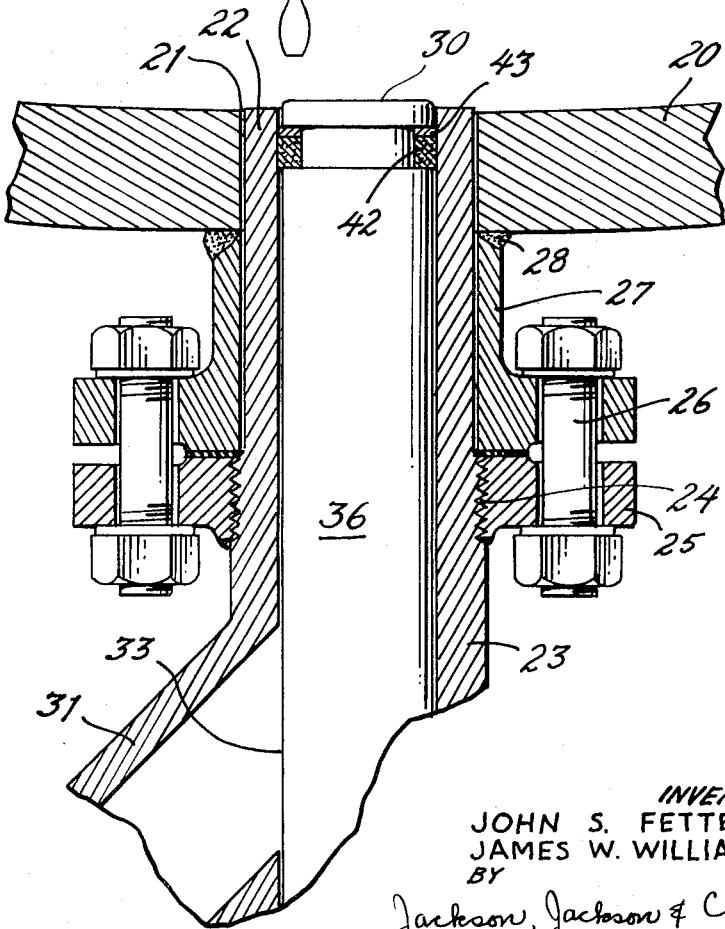
FIG. 2 is an illustration of the valve of FIG. 1 mounted on a tank, the view being a central vertical section.
Figure 3:
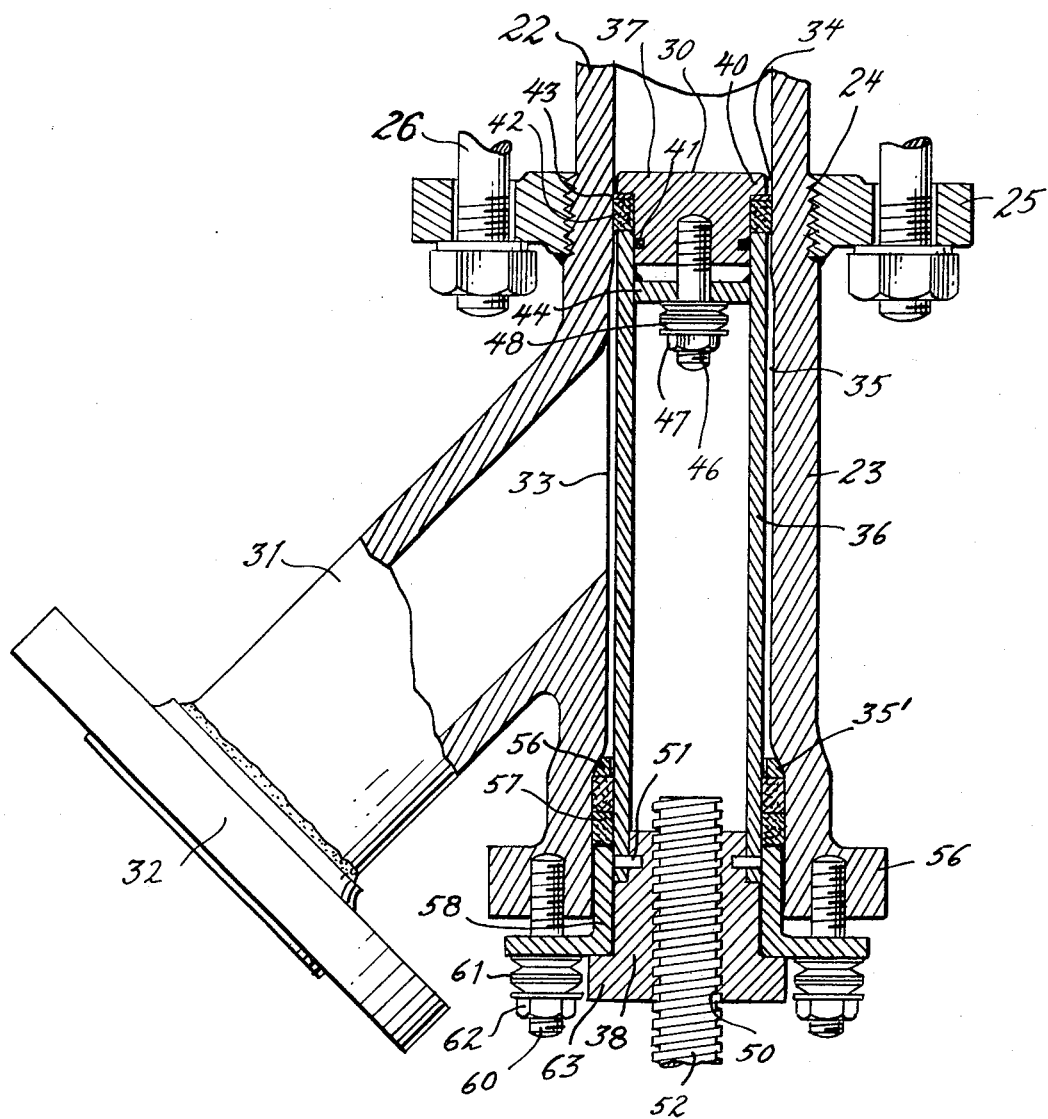
FIG. 3 is a central vertical section of the plunger and body, part of the body being shown in elevation.

There are several successful flush bottom tank valves on the market which employ the seatless principle which advances and retracts a plunger to open and close the valve. In one such valve the plunger closes clear of the internal flow passage eliminating any possibility of clogging when the next batch is withdrawn. The plunger is sealed by rings, suitably of polytetrafluoroethylene, which are located in the body and engage the plunger at the top and bottom. A bolted gland compresses these sealing rings. The gradual wear of the upper sealing ring, which is exposed to the effluent every time the valve discharges, disastrously affects the life of the valve. Also cold flow of the plastic makes the sealing rings extrude and limits their life.

An improved device is on the market which has spring loaded sealing rings in the body which are placed under compression in series by a sleeve extending from one sealing ring to the other. In this form the upper sealing ring is also unprotected when the plunger is open and is subject to erosion by the effluent.

The present invention seeks to overcome these difficulties.

In the device shown the upper packing moves with the plunger and is protected by the plunger from erosion when the valve is open. Furthermore the upper packing is compressed by springs which make it possible to regulate its compression. The inside of the body in the depending portion in which the plunger moves is ground or honed, making a seal with the upper seal ring when the plunger is closed.

The lower end of the plunger is sealed by a gland which is subjected to spring compression and which can be engaged by the lower plunger head to increase the lower packing compression when the valve is closed.

Ahead of the upper packing on the plunger, there is preferably a scraper of plastic such as polytetrafluoroethylene which removes any effluent adhering to the inner wall of the body. Thus the sealing surface of the body is wiped clean each time the valve is closed.

In the preferred embodiment the gland packing is more resilient than the seal ring, for example, being made of braided asbestos impregnated with polytetrafluoroethylene.

In the invention it is difficult to stick the valve tightly when it is closed because the end of the plunger forms a shoulder which allows only a minute amount of material from the tank to accumulate in the clearance between the body and the plunger. There is no extended plunger which will be likely to stick and prevent opening or will drag rough material from the effluent over the sealed ring.

Both the upper seal ring and the lower gland packing are accessible for replacement. This is especially true as the upper seal ring comes out with the plunger and is not inaccessibly buried in the body.

The upper plunger head can be made or coated with a protective material, such as stainless steel or stellite to permit the operation at higher pressures.

The valve of the invention is particularly intended for pressures of 1,200 psi and temperatures of 200° F., as a typical example.

As shown in the drawings the wall 20 of the pressure vessel has an opening 21 in the bottom through which a tubular extension 22 extends from a valve body 23. The body has threads at 24 which receive a threaded flange 25 which is united by bolts and nuts 26 to a flange 27 which is welded to the wall of the pressure vessel at 28.

The body 23 is of inverted Y-shaped formation having a depending straight opening 30 in which the plunger to be described operates and a branch 31 having a flange 32 which connects to the effluent piping. The effluent opening branches off at 33.

In the downwardly depending passage 30 there is a sealing portion 34 at the upper end which is honed and very smooth, there is a slight enlargement 35 of the bore below and opposite the side branch and a pronounced enlargement 35' at the lower end to receive the gland packing.

A plunger 36 of tubular shape has an upper head 37 telescoping into it and a lower head 38 set into it. The upper head 37 has a shoulder at 40 which extends out so that it clears the interior of the sealing surface with a slight clearance and has an O-ring packing 41 which seals it to the plunger. Between the shoulder at the end of the upper head and the end of the plunger, between the upper head on the inside and when sealing the body on the outside, there is a seal ring 42 which is preferably made of polytetrafluoroethylene, compounded to be a little bit softer than the maximum hardness.

Between the shoulder 40 at the end and the seal ring 42 is a scraper ring 43 in the preferable embodiment which is made of filled polytetrafluoroethylene and engages the inside of the body at the outside.

Inside the body near the upper end is a spring abutment 44 welded to the plunger. A stud 46 is threaded into the upper head, extends through an opening in the spring abutment 44 and by a nut 47 applies pressure to belleville springs 48 which compress the upper plunger head toward the plunger and thus compress the seal ring. The pressure may be adjusted through the opening in the interior of the lower head to be described. The lower plunger head 38 has a center threaded opening 50 and is secured to the plunger by a series of pins 51. The valve stem 52 is threaded on the lower head, and is turned by a hand wheel or suitable motor drive 53 on bearings 54 mounted on a standard 55 from flanges 56 on the body. In the enlarged portion of the body 35 there is a stop ring 56, gland packing 57 and a packing gland 58 which compresses the gland packing.

The packing gland is compressed by studs 60 on the flange 56 passing through openings in the packing gland and compressing belleville springs 61 by a nut 62. The lower plunger head 38 has an outwardly extending flange 63 which engages the packing gland and applies extra pressure to the gland packing when the valve is fully closed.

In operation assuming the valve is closed, the upper plunger head is suitably flush with the interior of the tank.

When the hand wheel or motor drive is started to move the plunger downward, the upper plunger head if stuck with respect to the valve body is free to lag behind the plunger in moving down, with compression of belleville springs 48. As pull builds up, the seal ring 42 frees itself and the pressure on the seal ring, which was momentarily relaxed, is restored.

If the upper plunger head is held by hardened material in the effluent, the belleville springs 48 can compress to solid height and positively pull the upper head loose.

As the plunger continues to move down it moves below the side branch 33 and the upper plunger head then protects the seal ring against deterioration by the effluent.

When the valve begins to close, the hand wheel and stem are operated and the lower plunger head, plunger and upper plunger head move upward. As the valve approaches closure, the seal ring effects a seal with the upper smooth portion of the body, and the scraper ring 43 cleans the body ahead of the seal ring.

As the valve finally reaches seating, the flange 63 engages the packing gland 58 and applies additional pressure to the gland packing 57, additionally guarding against leakage. In this position the upper plunger head is flush with the interior of the valve.

In view of our invention and disclosure, variations and modifications to meet individual whim or particular need will doubtless become evident to others skilled in the art to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a flush bottom tank valve, an inverted Y-shaped body having a depending portion adapted to surround a plunger, having an upper inside portion adapted to cooperate with an upper seal ring to make a seal, having an enlarged lower portion adapted to cooperate with a lower packing to make a seal and having a side outlet, a plunger body operating in the depending portion, a plunger upper head extending within the body and having an enlarged portion at the upper end, a seal ring between the enlarged portion of the plunger upper head and the upper end of the plunger body sealing when closed on the inside of the body, spring means urging the plunger upper head and the plunger body into telescoping relationship with respect to the seal ring, a plunger lower head on the lower end of the plunger body having a female thread therein, a threaded valve stem extending into the plunger lower head to manipulate the plunger, a packing gland extending between the enlarged portion of the body and the plunger lower head and plunger, spring means for compressing the packing gland and a gland packing in the space defined by the body, the gland and the plunger.

2. A valve of claim 1, in combination with a scraper ring acting between the upper plunger head and the seal ring on the inside of the body to clean the body when the valve must be manipulated.

3. A valve of claim 1, in combination with a shoulder on the lower plunger head bringing pressure on the packing gland when the valve is closed.

4. In a flush bottom tank valve, a body having a depending bore and an inverted Y-shaped outlet, a plunger riding in the bore, a seal ring carried by the plunger and in closed position of the valve sealing on the bore and in open position of the valve withdrawing with the plunger beyond the branching in the Y, means for compressing the seal ring, packing operating on the lower end of the plunger to seal it and means for compressing the packing independently of the means for compressing the seal ring.

* * * * *